United States Patent [19]
Bridgeford

[11] 3,852,224
[45] Dec. 3, 1974

[54] MICROPOROUS FILMS
[75] Inventor: Douglas J. Bridgeford, Champaign, Ill.
[73] Assignee: Tee-Pak, Inc., Chicago, Ill.
[22] Filed: Sept. 14, 1972
[21] Appl. No.: 289,197

[52] U.S. Cl............ 260/2.5 M, 106/122, 106/125, 106/164, 106/195, 106/196, 260/2.5 AY, 260/2.5 EP, 260/2.5 F, 260/2.5 H, 260/2.5 HB, 260/2.5 N, 260/722, 264/49
[51] Int. Cl... C08f 47/08, C08b 29/12, C08c 17/12
[58] Field of Search .................. 260/2.5 M, 2.5 AY; 106/122, 287; 264/49

[56] References Cited
UNITED STATES PATENTS

| | | | |
|---|---|---|---|
| 2,542,527 | 2/1951 | Honey et al..................... | 260/2.5 M |
| 2,707,201 | 4/1955 | Fernald et al.................... | 264/49 |
| 3,131,076 | 4/1964 | Richardson et al................ | 106/122 |
| 3,169,885 | 2/1965 | Golodner et al.............. | 260/2.5 AY |
| 3,378,507 | 4/1968 | Sargent et al................... | 260/2.5 M |
| 3,576,686 | 4/1971 | Schmidle et al. .................. | 264/49 |
| 3,753,932 | 8/1973 | Jenkins............................ | 260/2.5 M |
| 3,763,055 | 10/1973 | White et al..................... | 260/2.5 M |

*Primary Examiner*—Wilbert J. Briggs, Sr.
*Attorney, Agent, or Firm*—Russell L. Brewer; Neal J. Mosely

[57] ABSTRACT

This invention relates to an improved process for producing a polymer having pores substantially micellar in size and uniformly dispersed throughout the polymer. The formation of the pores is accomplished by incorporating a material in admixture with the polymer, dispersed as micelles, then converting the resultant admixture to a solid phase, and extracting a substantial proportion of the material in micellar form by swelling the solidified polymer with a solvent and converting the micelles to their monomeric constituent. Microporous films prepared in this manner are particularly useful as bacterial filters, binder compositions for ion exchange resins, and the like.

16 Claims, No Drawings

MICROPOROUS FILMS

DISCUSSION OF THE PRIOR ART

There has been a substantial amount of work conducted in the past for producing solid phase polymer systems having micropores therein. One of the early techniques for obtaining a microporous polymer was to incorporate a comminuted solid as the poreformer into a polymer dispersion, then converting the dispersion to a solid, often by evaporation of liquid carrier or cooling, and then contacting the solid with a solvent selective for dissolving the comminuted poreformer material but not capable of dissolving the polymer. By the extraction of the poreformer, micropores were introduced into the polymer system. Examples of comminuted poreformers used for this purpose were soluble solids such as sodium chloride, sodium bicarbonate, soluble polymers, e.g., polystyrene, starch, and sugars.

U.S. Pat. No. 3,378,507 shows producing micropores in a monoethylenically unsaturated hydrocarbon polymer by milling these polymers with an anionic surfactant and extracting the surfactant with water or by forming a dispersion of polymer, surfactant, and a solvent, converting the dispersion to a solid, and then extracting the surfactant with a non-polymer-swelling solvent typically water or caustic.

Another prior art method of producing micropores into a polymer system has been to treat a solution of a polyether-polyurethane in a hygroscopic solvent with moist air and then displace the solvent with water. Results of the process were considered undesirable largely because it was difficult to obtain uniform pore size.

Another method for forming micropores into a polymer system has been to cast a film from a solution of polymer and a water-immiscible solvent. The film is then washed with water and subsequently cooled to a temperature substantially below that of the freezing point of water, e.g., $-10°$ to $-50°C$. The water present in the film or in contact therewith freezes, upon cooling, into microcrystals. Thereafter, the microcrystals of ice are extracted by heating at a slow rate, under vacuum, to cause sublimation of the ice crystals.

SUMMARY OF THE INVENTION

The invention relates to an improvement in a process for forming microvoids in a normally solid phase polymer wherein a polymer is admixed with a poreformer, converted to a solid, and the poreformer extracted. The improvement resides in the incorporation of a surfactant material, dispersed with the polymer as micelles, and then extracting at least a substantial proportion of the surfactant from the polymer with a solvent. Preferably, the material is admixed with a polymer dispersed in a liquid carrier.

The microvoids in the polymer produced by practicing this invention are substantially smaller than the pores produced by the prior art processes even though the term "microporous" was used in describing some of those pore systems. The size of the micropores in the films using the solid phase poreformer, such as sodium chloride and sodium bicarbonate, was limited because of the inability to physically reduce the size of the poreformer beyond a certain range. The pores introduced into a polymer by formation of microcrystals of ice and subsequent sublimation of the microcrystals to the gaseous phase again produced large pores in comparison to the pores formed by this invention. Also, the microporous polymers produced by milling an anionic surfactant with a thermoplastic from a monoethylenically unsaturated monomer had much larger, i.e., macroscopic, pores than the micropores formed by this invention. The reason for these larger pore sizes is believed to be because the surfactant, on milling with the thermoplastic hydrocarbon polymer, forms a one-phase solution at the high milling temperatures reached and on cooling forms two distinct phases with the surfactant coalescing to form small, irregular and macroscopic capillaries. When the polymer is subsequently contacted with a solvent, these channels of surfactant are removed from the polymer system thereby leaving the hydrocarbon polymer intact possessing these irregular-shaped channels. Another disadvantage of prior art processes was the inability to produce substantially monodisperse (pores of similar size) systems.

Advantages of the instant process include: the ability to introduce microvoids of extremely small size into a polymer system; the ability to form such micropores in thermoset, natural, and thermoplastic polymers; and the ability to form pores of different sizes and shapes into the polymer by appropriate selection of surfactant and solvent system. For example, the micellar shape may be a sphere, a rod, an ellipsoid, or sausage. This shape often is reflected in the pore characteristics in the film. The microporous film finds application as a binder for ion exchange resins, battery separators, a filter medium for the removal of bacteria, and cellulose films as casings for edible wieners and sausages.

DESCRIPTION OF THE PREFERRED EMBODIMENTS

To achieve the formation of micropores in a polymer system, a material capable of micellization is added to a solution or dispersion of polymer (or a precursor of a polymer) under conditions such that the material is dispersed substantially as micelles. Micelles, as is known, are association polymeric groups or association colloids formed from the constituent monomeric units of materials typically referred to as surfactants. Often these polymeric micelles comprise from the tens to hundreds of monomeric units and have a molecular weight ranging from about one-thousand to several hundred-thousand or more. These micelles and aggregates thereof provide sites for pores in the polymer and thus act as the poreformers. The conditions for effecting formation of microvoids in a polymer then must be at a condition whereby the material is dispersed in its micellized form in a polymer. The polymer tends to form around these micelles, especially at high loading to provide a reticulated porous network when solidified. Therefore, to form microporous polymers, the concentration of surfactant and conditions existing at the time of the formation of a solid phase dispersion of polymer and material must be such that the material is in its micellar form.

The microporous films can be prepared from a variety of polymer types by including a surfactant in micellized form. The polymer may be in liquid form at the temperature at which the surfactant micellizes or it may be dispersed in a liquid carrier as typified by a latex or formed from a polymer precursor. The precursor may also be decomposed to form the polymer, e.g., as from hydrolyzing polyvinyl acetate. Leaching the micelles or micelle aggregates from the polymer when in a swollen state (at least 10 percent above its original dry volume) produces the microporous film.

To know when micellar conditions are reached one has to know the critical micelle concentration for the material used in the respective solvent. There is an abundance of literature on the critical micelle concentration for surfactants in aqueous and other solvent systems and methods for determining this concentration. The critical micelle concentration refers to the concentration of surfactant at which one is able to detect the presence of micelles. Several techniques are available for making such determination and they include the dye technique, light scattering technique, and osmotic pressure membrane. However, the critical micelle concentration may vary slightly for each analytical method used for the determination depending on the sensitivity for detecting micelles. As is known, by increasing the concentration of material above the critical micelle concentration one forms a greater concentration of micelles. For best operation in producing microvoids, it is desired to operate at a concentration well above the critical micelle concentration as this assures substantial abundance of micelles for the formation of the microporous polymer.

The surfactant materials which can be used in practicing this invention include any of the known surfactants. They should all have the ability to form micelles and the ability to form micelles in the polymer-liquid dispersion. A disclosure of many surfactants and critical micelle concentrations is found in a book entitled *Critical Micelle Concentrations of Aqueous Surfactant Systems* on work conducted by the National Bureau of Standards, published by the Superintendent of Documents, 1971. Other information on surfactants and properties are found in the books *Surface Active Agents and Detergents, Vol. II* by Schwartz, Perry, and Birch, published by Interscience Publishers, 1958, *Physical Chemistry of Surfaces* by Adamson, published by Interscience Publishers, Second Edition, 1967, *Colloidal Surfactants* by Shinoda, published by Academic Press, New York, 1963, and are incorporated by reference. The surfactant useful for practicing the invention can be any of the surfactants designated as anionic, nonionic, cationic, and ampholytic. Ampholytic refers to a surfactant containing both an acidic and basic group.

Examples of anionic surfactants for forming the microporous film include the following: high molecular weight fatty acids, e.g., those having 15 or more carbon atoms, and the alkali metal salts thereof. Examples of such fatty acids include stearic, palmitic, oleic, linoleic, dimerized linoleic, and tall oil rosin (dehydroabietic acid); the salt including sodium stearate, sodium palmitate, potassium stearate, potassium palmitate, potassium oleate; the alkaline earth metal salts include aluminum and calcium salts of such fatty acids. Other classes of anionic materials include hydroxylated ethers of alpha hydroxy fatty acids, alkenylsuccinic acids, and alanine, serine, and leucine condensates of fatty acids. A particular class having desirable features for practicing the invention are the sulfuric type esters, e.g., the sulfates and sulfonate derivatives of alcohols or the alkyl sulfonates such as lauryl sulfonate and the alkali metal salts thereof, e.g., sodium lauryl sulfonate. There are also the ester and ether linked sulfonates, the dialkylsulfosuccinates, the best known being di-2-ethylhexylsulfosuccinate. Other examples of sulfonates are the alkylaromatic sulfonic acids and alkali metal salts thereof such as dodecyl benzene sulfonic acid, lauryl benzene sulfonic acid, octylbenzene sulfonic acid, sodium lauryl benzene sulfonate, sodium dodecyl benzene sulfonate, and the alkylnapthalene sulfonates.

Nonionic surfactants, of course, are those which do not have an ionic portion in the molecule. However, they can be used in making a microporous film. Generally, nonionic surfactants contain a plurality of hydroxy groups or a plurality of ether groups or a combination of both. Examples of nonionic emulsifiers are the polyoxyethylene derivatives of polyhydric alcohols having from two to six carbon atoms such as polyoxyethylene derivatives of propylene glycol, polyoxyethylene derivatives of glycerol, and polyoxyethylene derivatives of higher molecular weight polyhydric alcohols such as sorbitol and mannitol. They can also be esters of polyoxyalkylene derivatives of polyhydric alcohols where a fatty acid radical provides an ester linkage. Examples of such nonionic surfactants include polyoxyethylene sorbitan monostearate, polyoxyethylene sorbitan monooleate, polyoxyethylene mannitan monostearate, the alkyl oxyethylene esters such as methoxyethylene dodeconoate and ethoxyethylene dodeconoate. Also included as nonionic surfactants are the fatty alkyl phenols such as nonyl phenol and octyl phenol and the alkoxylated alkyl phenols, e.g., ethoxylated or propoxylated nonyl phenol or polyoxyethylene octyl phenol, and the like. Included in this class are the polyethynoxy ethers of alkyl phenols and the polyethynoxy esters and ethers of alkyl phenols.

Cationic surfactants can also be used for practicing the invention. Generally, the cationic portion is provided through a quaternary ammonium or quaternized tertiary amine salt group. Examples of acceptable cationic surfactants are the hexyltrialkyl ammonium dodecyl sulfates and sulfonates such as hexyltrimethyl ammonium dodecyl sulfate and hexyltrimethyl ammonium dodecyl sulfonate and hexyltrimethyl octydecyl sulfate. Other ammonium type cationic surfactants include dodecyl trimethyl ammonium chloride, dodecyl trimethyl ammonium bromide, dodecyl tris-2-hydroxyethyl ammonium chloride, octodecyl trimethyl ammonium acetate, tetradecyl ammonium chloride, octyldecyl trimethyl ammonium oxalate, octodecyl trimethylammonium bromate, and the like. Quaternized tertiary amine salts include cetyl pyridinium chloride, lauryl pyridinium chloride, etc.

Ampholytic surfactants are those containing both cationic and anionic activity. Although they can be used for practicing the invention, they usually are not as they do not appear to be more advantageous than the anionic and nonionic surfactants. Examples of ampholytic surfactants include: carboxy-amino types, e.g., condensed from chloroacetic acid and ethylenediamineamino sulfonic types, e.g., methyl morpholinium methosulfate.

Most of the surfactants listed above are of the nonpolymeric type. Although the polymeric surfactants such as polyvinyl alcohol sulfonates, as well as others, can be used and are referred to in the reference texts, generally they are not preferred. The molecular weight of these surfactants often is high and the micelles on breaking down to the monomeric constituents do not form a small enough molecule for easy extraction even though the polymer is in a swollen state. Ideally, a low molecular weight surfactant which forms a high molecular weight micelle is used as this type generally affords for easy extraction from the swollen polymer.

In the reference books listed in the discussion of the prior art, many more anionic, cationic, and nonionic surfactants and their critical micelle concentrations are listed and these surfactants can be used in forming microporous films so long as they form micelles when dispersed in a polymer. Such surfactants listed in these reference books are incorporated by reference.

The amount of surfactant material which is dispersed as micelles generally is about 5 – 300 percent by weight of the polymer. In this 5 – 300 percent range, in appropriate medium, one is generally assured that the surfactant concentration will be substantially above the critical micelle concentration. This amount of surfactant also insures that a substantial proportion of micelles will be available for forming the micropores in the polymer. When the amount of material, e.g., surfactant, is below about 5 percent by weight of the polymer in the system, the level of micelles often is insufficient to form a desireably porous polymeric structure. Tubular casings for edible meat products generally require a more porous film to allow cooking and make water vapor penetration. Amounts above about 300 percent often produce a highly porous polymer system which does not have sufficient strength to retain its shape. Moreover, the polymer often collapses filling in the pores generated by the micelle. Additionally, the amount of material above about 300 percent by weight of the polymer is difficult to blend in with the polymer and liquid carrier and sometimes separates after centrifugation to form distinct phases. Thus, the surfactant micelle is not dispersed in the polymer as a micelle and cannot form a microporous structure but rather forms a macroporous structure. Preferred amounts of surfactant are from about 10 – 150 percent surfactant material by weight of the polymer. This level generally is above the critical micelle concentration for most surfactants and provides a porous polymer structure having sufficient strength to be useful for a multitude of applications.

The polymers useful for preparing the microporous polymer system of this invention can be any of the natural, thermoset and thermoplastic polymers or polymer precursors dispersible in a liquid vehicle under conditions for surfactant micellization. Typically thermoplastic polymers are derived from vinyl monomers by free radical polymerization. Vinyl monomers which can be used for the synthesis of the microporous polymer films include the lower alkyl esters of acrylic or methacrylic acid having from one to eight carbon atoms such as methylacrylate, methylmethacrylate, 2-ethyl-hexylacrylate, butyl acrylate, hydroxypropyl methacrylate, hydroxyethyl acrylate, acrylic and methacrylic acid, acrylamide, diacetone acrylamide, vinyl and vinylidine halides such as vinyl chloride and vinylidene chloride thereof, vinyl acetate, vinyl butyrate, styrene, butadienestyrene.

Polymer types from the monomers above can be homopolymers, copolymers, or interpolymers derived by polymerizing one or more of the monomers above. They can also be converted from a precursor such as polyvinyl acetate by hydrolysis to produce polyvinyl alcohol or a polyvinyl acetate-polyvinyl alcohol copolymer. Other polymers include ethylene-vinyl acetate copolymer, polyvinyl butyral, etc.

Polyurethane resins commonly derived from the reaction of a polyisocyanate and a polyhydric alcohol have been found as being adaptable in latex form as this provides a desirable medium for micellization of the surfactant. Polyisocyanates include tolylenediisocyanate, 1,5-napthalene diisocyanate, and polyhydric alcohols include propylene glycol, ethylene glycol and glycerol.

Additionally, thermosetting polymers can be used for forming microporous films. Advantageous results have been obtained where functional groups are incorporated onto the polymer backbone. Representative functional groups are hydroxy-carboxy or amine-carboxy groups or amine-aldehyde and alkoxy-carboxy and generally are preferred to those where unsaturated groups are used for making a cross linked polymer. Examples of thermosettable compositions which can be made microporous include mixtures of hydroxy alkyl acrylates such as hydroxy propyl methacrylate and a copolymer of ethyl acrylate-acrylic acid or methacrylic acid and amine-type polymers such as melamine-formaldehyde, phenol-formaldehyde, novalacs, and melamine acrylates, polyesters derived by the reaction of polyhydric alcohols with $\alpha$-$\beta$-unsaturated dicarboxylic acid dissolved in vinyl monomer, and short and long oil modified aldehydes, also can be utilized provided that the surfactant selected is one which can be dispersed as micelles in the polyester solution. Epoxy resins, e.g., those from Bisphenol A, glycerol, resorcinol, and epichlorohydrin can also be used as the polymer. Also, they can be crosslinked or cured with polyamide, polyamine resins or the latter resins used alone for making the microporous polymer.

Natural resins and derivatives such as the cellulose types can be used for making microporous polymers. They include rosin, cellulosics such as cellulose acetate, cellulose nitrate, cellulose acetate butyrate, cellulose, collagen, gelatin, alginates, amylose, rubber, and the like.

Microporous films of particular usefulness as casings for food products can be made from regenerated cellulose, alginates, amylose, polyvinyl alcohol, and collagen. Microporous cellulose is swellable in water providing for efficient removal of the micelles. Secondly, the microporous nature of the casing prevents substantial bacteria from permeating the film while allowing smoke and flavorants to pass through during a cooking operation.

Care should be exercised in selecting the above polymers and copolymers to the extent that such polymer does not cold-flow at room temperature or the micelle extraction temperature. If these polymers do exhibit cold-flow, it may be impossible to remove the surfactant micelle or, if removed, the polymer may collapse filling in the void.

Liquid carriers useful for forming a dispersion of polymer and material dispersed as micelles can be any which allow the micellular conditions to exist. Thus, the carrier must be one that provides for at least a colloidal dispersion of resin in the vehicle or as a solution and it must also afford a medium in which micelles can coexist with the resin. If the carrier cannot meet these conditions then micropores cannot be introduced into the polymer system by this process. For reasons of efficiency and economy, the liquid carrier is water, a low alkanol such as methanol, ethanol, and butanol or toluene.

By appropriate selection of carrier and surfactant, utilizing the information in the texts cited herein, one can select conditions whereby the micelle will be of relatively large or small size. The molecular weight of the micelle often has an ultimate bearing on the size and shape of the pore formed in the polymer. For example, sodium dodecyl benzene sulfonate in water is reported to have a micellar molecular weight of about 1,000 to 1,700. On the other hand, sodium dioctyl sulfosuccinate may have a micellar molecular weight of about 7,100 in the same carrier. Thus, one could form larger pores in a polymer by using the dioctyl sulfosuccinate. Nonionic surfactants, such as tertiary dodecyl nonaethylene glycol thioether, has been reported to have a micellar molecular weight of from 40,000 to 51,000, thus substantially larger pores generally can be created in the film by using this surfactant.

Ionic salts also can be introduced into the dispersion of polymer, liquid carrier, and micelles to alter the micellar size and shape. The shape of the micelle also can be altered by appropriate selection of carrier and conditions, e.g., temperature, the shape changing from a spherical shape to perhaps a rod, disc, torus, or cigar shape. For example, sodium dodecyl benzene sulfonate in water may have a spherical shape whereas cetyl pyridinium chloride in toluene has a rod-like shape. The difference in shape of the micelle, i.e., either rod or spherical, often is carried over into the structure of the pore in the polymer. This generally is dependent on the loading of surfactant into the polymer.

Pore sites it is believed are formed by the polymer solidifying about the micelles or micellar aggregates dispersed therein. By extracting the micelles from the polymer, generally at least 50 percent and preferably above 80 percent of the micelles, a porous structure is created. Extraction normally is carried out by deassociation wherein the micelle is converted to its monomeric unit. Deassociation or depolymerization of the micelle is carried out by incorporating a solvent capable of causing such deassociation of the micelle while simultaneously swelling the polymer film to allow the solvent to contact the micelles and effect deassociation. Additionally, there must be a sufficient amount of solvent to wash away the micelle in its depolymerized state. By consulting the reference texts cited in this application, one can select appropriate solvents and determine the critical micelle concentration. Secondly, one can review appropriate texts or perform tests to determine whether the solvent will swell the polymer to permit removal of micelles. It is to be understood that if only a slight degree of swelling, i.e., less than about 10 percent of original volume is effected by the solvent then probably a substantial amount of solvent will have to be used in an effort to depolymerize and extract the micelle. If the polymer is insufficiently swollen, then it may be impossible to contact the micelle with solvent for removal.

With many of the polymers, particularly the regenerated cellulose films, water acts as a carrier; it acts as a solvent for swelling the film; and it acts as a medium for depolymerizing the micelle in the cellulose polymer for extraction. Other examples of carriers and solvents include lower alkanol such as methanol, ethanol and butanol can be used to accomplish the same purpose in given polymer and surfactant situations.

Analysis of the solvent recovered after contacting with the polymer will indicate the amount of surfactant removed from the polymer and give an indication of the rate of removal of surfactant from that polymer. If the rate is slow, the solvent can be changed. For best results, one should continue washing the polymer until at least 60 percent of the dispersed micelles are removed from the polymer.

The following examples are provided to illustrate preferred embodiments of the invention and to illustrate how to practice the invention. All temperatures are in degrees centigrade unless otherwise specified, all parts are parts by weight, and all percentages are expressed as weight percentages.

EXAMPLE 1

MICROPOROUS CELLULOSE WITH ANIONIC SURFACTANT

A viscose solution was prepared by a conventional viscose process wherein a chemical grade cellulose is treated with caustic soda, shredded, and reacted with carbon disulfide to produce cellulose xanthate. The cellulose xanthate thus formed is dissolved in caustic to produce viscose.

A first sample of 400 g of viscose solution prepare by the process above, and containing 7.7 percent cellulose and 6.4 percent NaOH, was used as a control. This solution was centrifuged for about 20 minutes at 2,000 G to remove air bubbles and the centrifuged mixture cast onto a plate, and drawn down with a 22 mil draw bar to form a wet film. Centrifuging at 2,000 G also eliminates any distinct phases which may be formed and thus effect macroscopic pore size in the polymer. The cast film then was passed under a coagulating solution of sulfuric acid and sodium sulfate to form a hard film.

A second sample was prepared by admixing 400 g of viscose solution and 0.3 g of Aerosol OT-B surfactant, (85 percent sodium dioctylsulfosuccinate and about 15 percent sodium benzoate). The surfactant is reported to have a micellar molecular weight of about 7,200 in water. The admixed solution was centrifuged and a film cast and coagulated in essentially the same manner as was the control sample.

A third sample was prepared by admixing 400 g of viscose solution and 3 g of Aerosol OT-B. The admixed solution of viscose surface active agent was centrifuged for removal of any air bubbles, cast and coagulated in a like manner as the first sample.

A fourth sample was prepared by admixing 500 g of viscose solution with 10.2 g Aerosol OT-B. The mixture was blended for homogeneous dispersion of the surfactant, centrifuged for removal of air, cast onto a plate and coagulated in a like manner as the first sample.

Each of the four films produced above then were washed with hot water (60°C) for about 2 hours, the water causing the film to swell and allow depolymerization or deassociation of the micelle to its monomeric constituent for extraction. Analysis of the wash water for Samples 2, 3, and 4 indicated that substantially all of the surfactant was removed from the polymer system. Previous chemical analysis of the polymer had shown that all of the surfactant was removed from the polymer when the wash water showed no indication of surfactant. The control was washed similarly. The control film was substantially clear. The second sample was slightly turbid and was not as clear as the control. The third and fourth samples were substantially more turbid than the first two samples and the fourth sample was substantially more turbid than the third. Previous evaluation showed that turbidity or light scattering of a normally transparent film was caused by very small pores (about 0.5 – 5 microns) within the polymer system.

The control cellulose films and the films from Samples 2, 3, and 4 produced by incorporating the surfactants into the film were evaluated for pore size. This was done by means of microscopic evaluation, particularly with reflected and transmitted light, by oil immersion optics tests, and by hyperfiltration tests employing a hydrostatic pressure of 500 millimeters mercury (mm. Hg) or about 20 inches Hg. The control film was substantially non-porous. The holes present in the second, third, and fourth polymer structure, with the pore-former being the surfactant micelle, showed a substantially homogeneous distribution of a large number of pores but smaller and more uniform in diameter than the pores seen in moire-type cellulose casing, a casing made by coagulating a control film using a coagulating solution with a high acid to salt ratio. The pore size in the moire film was in the neighborhood of 0.5 – 5 microns.

D were opalescent and turbid in color. The turbidity increased in the films with each increase in proportion of surfactant employed indicating a higher proportion of micropores.

Hyperfiltration tests at 20 inches mercury or approximately 500 mm. mercury were made on the films for a comparison of water flow rate there through vis-a-vis the control. The filtration rates showed that films became much more porous with increasing level of surfactant and all were more porous than the control film. Table I below is set forth to show the results of tests made on this film.

TABLE I

| FILM | AVE. 10 MEASURES FILM THICKNESS (MILS) | HYPERFILTRATION GMS/WATER/HOUR/ IN$^2$ AT 20" Hg PRESSURE |
|---|---|---|
| Control | 10.3 | 0.369 |
| Sample A 10% Surfactant | 10.2 | 0.585 |
| Sample B 20% Surfactant | 10.9 | 0.712 |
| Sample C 50% Surfactant | 13.9 | 0.864 |

EXAMPLE 2

MICROPOROUS CELLULOSE WITH ANIONIC SURFACTANT

Test control and microporous films were prepared by using the following general formulation. Two-hundred grams of viscose containing 7.7 percent cellulose and 6.4 percent NaOH were added to each of four test tubes. Then, 20 g water or surfactant solution were added to each test tube as follows and blended with the viscose. Sample A was prepared by adding 20 g of water to one test tube as a control. Sample B, containing 10 percent surfactant by weight of the cellulose, was prepared by addition of 1.5 g sodium lauryl sulfate surfactant (sold under the trademark "Duponol AW") and 18.5 g water to the viscose. Sample C, containing 20 percent surfactant was prepared by addition of 3 g sodium lauryl sulfate surfactant and 17 g of water. Sample D, containing 50 percent of sodium lauryl sulfate surfactant by weight of the cellulose, was prepared by addition of 7.5 g sodium lauryl sulfate surfactant and 12½ g water to the viscose.

Each of the samples, including the control, were centrifuged at 2,000 G for removal of air and coagulum. The resulting solutions after centrifugation were cast onto a plate and leveled with a 30 mil. draw bar. The wet films then were coagulated with the sulfuric acid-sodium sulfate salt solution described in Example 1 and then washed with hot water. The control film was transparent and clear as might be expected. Films B, C, and

EXAMPLE 3

MICROPOROUS FIBROUS REINFORCED FILM

Fibrous casings for processing larger sausages, such as salamis and bolognas, are conventionally prepared by impregnating a long-fiber hemp paper with viscose; forming a tube; and treating with an acid-salt regenerating bath to produce a tubular fibrous reinforced regenerated cellulose product. Fibrous casings can be made microporous in structure by the process of this invention.

A 12 inch × 12 inch sheet of long-fiber hemp paper, sized with 2 percent regenerated cellulose for wet strength, is float coated on a viscose solution (7 percent cellulose, 6 percent NaOH) and coagulated and regenerated using a conventional acid-salt bath. The product is plasticized with aqueous glycerol and dried to yield a paper-reinforced regenerated cellulose film which is lightly translucent. This is an untreated control.

A second 12 inch × 12 inch sheet of hemp paper, as used above, is float coated on a viscose solution (7 percent cellulose, 6 percent NaOH) containing 20 percent sodium lauryl sulfate based on the cellulose. The coated sheet is then treated with a conventional acid-salt coagulating and regenerating bath. The sheet is subsequently washed with water until the wash water shows no trace of surfactant. The sheet is then treated with aqueous glycerol and dried. The paper-reinforced regenerated cellulose sheet is white from the micropores introduced by the surfactant-modified viscose.

When this procedure is carried out using viscose with different loadings of surfactant it is observed that the opacity of the paper-reinforced film increases with the proportion of surfactant. This obviously is due to an increase in microporosity with increase in surfactant content of the viscose.

EXAMPLE 4

MICROPOROUS CELLULOSE AS FILTERS

Test samples were made with 300 g of viscose containing 7.0% wt. cellulose and 6% wt. NaOH, the viscose being made by the process of Example 1. A control sample was made by admixing 200 g water to 300 g viscose. Sample A was prepared by adding 200 g of a solution containing 25% wt. solids sodium dodecylbenzene sulfonate in water. The mixed solution contained about 200% wt. surfactant based on the cellulose. Both samples were centrifuged and processed in like manner as the samples in Example 1. Films were cast and leveled with a 50 mil draw down bar and the resulting films coagulated with the acid-salt solution of Example 1. These films then were washed with 60°C water for about 60 minutes. The control film was translucent in color whereas the Sample A film made with the surfactant was opaque indicating the presence of small pores.

A bacterial test was used to determine the magnitude of the pores in the film and the utility of the film as a filter for removal of bacteria. A bacterial culture of 1 × 10$^9$ bacteria/cc was filtered through a 47 mm. disk of the microporous cellulose. The bacterium was about 0.3 micron in size. Incubation of the filtered culture medium at room temperature gave no observable growth. Because none of the bacteria passed through filter this indicated the pore size was less than 0.3 micron.

Another filtration test was performed with the microporous film produced in this example by filtering an acrylic latex having a reported average particle size of about 2,000 Angstroms. No trace of latex was seen in the filtrate even though vacuum was applied.

Hyperfiltration rates for water through the Sample 1 film at 20 inches Hg was about 140 g per hour per square inch. The control had a hyperfiltration rate of about 0.14 g water per hour per square inch.

EXAMPLE 5

MICROPOROUS CELLULOSE WITH NONIONIC SURFACTANT

Two cellulose films were prepared in essentially the same manner as the films in Example 1 except that a nonionic surfactant was used in place of the anionic surfactant. The nonionic surfactant used in preparation of one of these films was an ethoxylated octyl phenol having an average of 9 – 10 polyoxyethylene units per mole of octylphenol sold under the trademark of "Triton X-100." The micellar molecular weight of this surfactant in water was reported to be about 208,000.

In preparing this cellulose film, 300 g of viscose containing 7.7 percent cellulose and 6.4 percent NaOH, 200 g water, and 50 g Triton X-100 was mixed in a high speed mixer and centrifuged. The centrifuged mixture then was cast onto a plate as a wet film and leveled with a 30 mil draw bar. Thereafter, it was coagulated with the salt-acid solution used in Example 1. The resultant film then was washed with hot 60°C water for about one hour. It was observed that the extraction rate of the nonionic surfactant from the polymeric film was much slower than the anionic surfactant. However, the films produced after washing were transparent with slight opalescence but not substantially more than a control film. It was believed that the very few micropores were generated by the addition of the X-100 to the viscose and primarily because the surfactant was not adequately extracted from the polymer even though the polymer was swollen by the hot water.

The second cellulose film was made in exactly the same manner as the first film except for employing a nonionic surfactant having a slightly higher polyoxyethylene content, namely an ethoxylated octyl phenol having 12 – 13 average polyoxyethylene groups per mole of octylphenol. This surfactant was sold under the trademark "Triton X-102." A film was cast and drawn down with a 30 mil bar and coagulated with the sulfuric acid-sodium sulfate coagulating solution of Example 1. The coagulated film then was washed with hot 60°C water which caused swelling of the cellulose film and depolymerization of the micelles to the monomeric constituents for removal of the surfactant. Again, the extraction rate of the surfactant from the film was slow as compared to the anionic surfactant but faster than the Triton X-100. This probably was due to the higher solubility of surfactant in water. The resulting film had a higher degree of turbidity than the film employing the Triton X-100 surfactant.

Comparative results for the cellulose films prepared with the nonionic surfactants are shown in Table II below.

TABLE II

| FILM | FILM THICKNESS AVE. 10 MEASURES | HYPERFILTRATION RATE GRAM/WATER/IN$^2$/HR |
|---|---|---|
| Cellulose-Triton X-100 | 9.1 mils | 1.55 |
| Cellulose-Triton X-102 | 9.1 mils | 2.7–3.0 |
| Control | 9.0 mils | 0.4 |

EXAMPLE 6

MICROPOROUS POLYURETHANE WITH ANIONIC SURFACTANT

An 80 g portion of polyurethane latex having a 50 percent solids content was mixed with 80 g of a 25 percent solution of sodium dodecylbenzene sulfonate in water. The concentration of surfactant was 50 percent by weight of the polymer. A high speed Heller mixer was used to blend the surfactant into the polyurethane latex. After blending, the resultant mixture was centrifuged for about 45 minutes to remove air bubbles and coagulum as was done in Example 1. After centrifugation, a film was cast onto a glass plate and drawn down with a 50 mil bar. Then, it was dried at a temperature of about 105° – 110°C for 80 minutes.

The film had a soft, clear and almost translucent appearance. This film was washed with 40°C water which caused swelling of the film and depolymerization of the micelles. On washing, the film became quite opaque in color. The film had a soft, chamois-like feeling after about 35 – 40 minutes washing. Then, the film was dried. On adding water to the dry film, it took on a wet, opaque appearance but resumed its chamois-like appearance on redrying. A control urethane film was prepared by adding 80 g water instead of the surfactant to 80 g latex. It was mixed, centrifuged, and cast in same manner as first microporous urethane film. The control did not have a chamois-like feel nor did it absorb substantial water on wetting. The hyperfiltration rate of the microporous film at 20 inches Hg was 165 g water/hour/sq. in. whereas the control for the same filter area was substantially impervious.

EXAMPLE 7

MICROPOROUS ACRYLIC RESIN WITH CATIONIC SURFACTANT

Two-hundred grams of a self crosslinkable acrylic latex, having a 30 percent solids content, was mixed with 100 ml. of a 0.5 molal solution in toluene of a cationic surfactant reported as having rod-shaped micelles, namely, laurylpyridinium chloride. After mixing, the mixture was centrifuged to remove coagulum and any air which might have been entrained by the incorporation of the surfactant.

Films were cast onto a glass plate and drawn down with a 30 mil bar. Thereafter, the films were dried and cured at about 110°C to form a thermoset resin. The cured films then were washed with hot (70°C) water for about 35 minutes for effecting depolymerization of the micelle. Surface tension analysis indicated most of the surfactant was extracted from the polymer by the washing operation. The washed film on drying had an opalescent and porous appearance. On the other hand, a control film made without the surfactant was translucent in color.

EXAMPLE 8

MICROPOROUS VINYL ACETATE

A 30 g portion of vinyl acetate latex was diluted with 60 g of water and 30 g of the cetylpyridinium chloride (a cationic surfactant reported as having a rod-shaped micelle) and blended in a high speed agitator. Then, the agitated mixture was centrifuged for removal of air bubbles and coagulum. The vinyl acetate mixture then was cast onto a glass plate and drawn down with a 15 mil draw bar. The film was dried at a temperature of about 100°C and subsequently washed with hot 40°C water for over four hours until the last of the surfactant in the polymer was substantially removed. Removal of surfactant was determined by surface tension measurement. The resulting film obtained had an off-white appearance. Hyperfiltration rates indicated that the material was substantially more porous than control films.

A 120 g portion of polyvinyl acetate in methanol, having a 60 percent solids content, and 12½ g of cetyltrimethyl ammonium bromide dissolved in a 120 g methanol was mixed in a high speed Heller agitator. In water, cetyl trimethyl ammonium bromide is reported as having a critical micelle concentration of about 0.04 percent, an ellipsoidal shaped micelle and a molecular weight of about 53,000. The mixture was centrifuged at 1,000 g for 1½ hours for removal of air bubbles. Several films of varying were cast onto glass plates from the resultant polyvinyl acetate solution. The film thicknesses were 2, 8, 15 and 30 mils, respectively. The resulting films then were air dried at 100°C for about 5 minutes and washed with hot water. Each of the films had a white, turbid appearance, but the thicker films had substantially more turbidity than the film of 2 and 8 mil thicknesses. The control was clear and substantially non-porous as evidenced by hyperfiltration tests. The microporous films had substantially higher filtration rates.

Microscopic evaluation of the film under oil immersion showed the presence of pores but much smaller than the 0.5 - 5 micron size found in moire type cellulose films, i.e., those coagulated with a high acid to salt ratio.

EXAMPLE 9

MICROPOROUS NYLON

Microporous films were made with hydroxylated nylon 66 by dispersing 40 g of the hydroxylated nylon 66 polymer in 400 g of an 85 : 15 wt. mixture of methanol and water. A 40 g portion of stearic acid was blended with the dispersion of polymer in methanol-water by means of a high speed agitator and the resultant agitated mixture centrifuged for removal of air and coagulum. Films of 8, 15 and 30 mil thicknesses were cast onto a plate, dried and subsequently washed with warm water. The stearic acid was difficult to extract from the polymer structure with hot water. The extraction rate was somewhat faster on washing with dilute caustic soda.

The resulting film had an opaque appearance and on heating to 320°F clear spots were produced indicating a coalescence of the pores.

EXAMPLE 10

MICROPOROUS GELATIN USING ANIONIC SURFACTANT

A 225 g portion of a 3 percent aqueous gelatin solution was melted by heating to about 100°F and 11.5 g of sodium lauryl sulfate was added thereto and blended for homogeneous dispersion. Then 5 percent glyoxal based on the solid content of the gelatin solution, that is solids contributed by the gelatin and by the surfactant, was added to the solution and mixed. Then the pH was adjusted to 4 by adding hydrochloric acid. Films were cast by pouring the solution onto a glass plate and drying at 100°C until the water was removed from the film. The film then was allowed to cool to room temperature and washed with 40° - 45°C water. This caused the film to swell and effect depolymerization of the micelles permitting extraction of the surfactant micelles from the film. After washing, the film had a turbid to snow-white appearance indicating the presence of a microporous structure in the film.

EXAMPLE 11

MICROPOROUS POLYETHYLENE-PARAFFIN WAX

A 55 g portion of a polyethylene-paraffin wax latex containing 24 percent 135°C melting point paraffin and 16 percent polyethylene was admixed with 55 g of water in a vessel. A 20g portion of a 0.2 molar solution of cationic surfactant, namely, lauryl pyridinium chloride in toluene was added to the mixture. The mixture then was poured onto a glass plate and leveled with a 15 mil draw bar and dried to form a film. Then, the films were washed with hot water for swelling the film and effecting depolymerization of the micelles present in the film and thereby removing the surfactant.

On washing, the film obtained an off-white appearance and after complete washing the film became substantially snow-white. Microscopic evaluation of the film indicated the presence of very small pores. A control film made by incorporating 20 g of water instead of the 20 g of 0.2 molar toluene solubilized cationic surfactant was translucent in color as opposed to the snow-white appearance of the film made with the surfactant.

I claim:

1. In a process for forming a microporous solid polymer in which said polymer is solidified in admixture with a finely dispersed poreformer which is subsequently leached therefrom, the improvement which comprises solidifying said polymer in admixture in a liquid medium with a poreformer surfactant material finely dispersed as micelles and treating said solidified polymer with a solvent in which said polymer is substantially swollen and in which said micelles revert to molecular size whereby the micellar poreformer is leached out producing a microporous structure comprising a plurality of pores of the size of micelles or micelle aggregates.

2. The process of claim 1 wherein said polymer is formed into a film.

3. The process of claim 2 wherein said film is formed in a fibrous support.

4. The process of claim 1 in which said polymer is formed from a polymer precursor.

5. The process of claim 4 in which said polymer precursor is partially decomposed to produce said polymer.

6. The process of claim 5 in which said polymer precursor is viscose and said polymer is regenerated cellulose.

7. The process of claim 4 in which said polymer precursor is hydrolyzed to produce said polymer.

8. The process of claim 7 in which said polymer precursor is a polyvinyl ester and said polymer is polyvinyl alcohol or a vinyl ester-vinyl alcohol copolymer.

9. The process of claim 4 in which said polymer is a condensation polymer.

10. The process of claim 1 in which said polymer is a natural polymer.

11. The process of claim 1 wherein said polymer is solidified in admixture with said surfactant material and a liquid carrier.

12. The process of claim 11 wherein said liquid carrier is predominately water.

13. The process of claim 1 wherein said surfactant material is an anionic surfactant, cationic surfactant, nonionic surfactant, or ampholytic surfactant.

14. The process of claim 13 wherein said anionic surfactant is an alkyl aromatic sulfate or sulfonate, an alkane or alkene sulfonate, a fatty acid, or a soap of a fatty acid.

15. The process of claim 13 wherein said cationic surfactant is a quaternary amine salt or a quaternized tertiary amine salt.

16. The process of claim 13 wherein said nonionic surfactant is a fatty alkyl phenol, an ethoxylated alkyl phenol, or an ethoxylated polyhydric alcohol.

* * * * *